United States Patent [19]

Nozick

[11] 4,328,524
[45] May 4, 1982

[54] CABLE HEAD WITH PROTECTION FOR A TELEPHONE EXCHANGE DISTRIBUTOR

[75] Inventor: Jacques E. Nozick, Paris, France

[73] Assignee: C.T.M., Paris, France

[21] Appl. No.: 155,822

[22] Filed: Jun. 2, 1980

[30] Foreign Application Priority Data

Oct. 8, 1979 [FR] France .................................. 79 24976

[51] Int. Cl.³ .......................... H02H 1/04; H02H 3/22
[52] U.S. Cl. ........................................ 361/119; 179/98
[58] Field of Search ............................. 361/119, 117; 339/198 G, 198 R, 198 GA, 198 H, 198 K, 198 S; 179/98

[56] References Cited

U.S. PATENT DOCUMENTS

| | | | |
|---|---|---|---|
| 3,518,611 | 6/1970 | Shores, Jr. ......................... | 179/98 X |
| 3,610,836 | 10/1971 | Kimura et al. ......................... | 179/98 |
| 4,017,768 | 4/1977 | Valfre ........................... | 179/98 X |
| 4,037,910 | 7/1977 | Paluch ............................. | 179/98 X |
| 4,146,755 | 3/1979 | Causse ........................... | 361/119 X |

Primary Examiner—Reinhard J. Eisenzopf
Attorney, Agent, or Firm—Sughrue, Mion, Zinn, Macpeak and Seas

[57] ABSTRACT

A cable head includes a plurality of modular connection units, the insulating base of which bears rear and front connection members, and one earthing component. The cable head includes, in addition for each connection unit, at least one protection module which can be plugged into the base from the front, the module comprising a body of insulating material exhibiting two side-housings intended to each receive one lightning arrester, and of two pairs of wrap-around contact components arranged on the body and effecting on the one hand the contact between the front and rear connection members arranged face to face and on the other hand the contact with earth, each pair of contact components associated with a lightning arrester ensuring both the retention of the lightning arrester in its housing and reinforcement of the clamping onto the tails of the lightning arrester upon plugging in the module.

21 Claims, 22 Drawing Figures

CABLE HEAD WITH PROTECTION FOR A TELEPHONE EXCHANGE DISTRIBUTOR

BACKGROUND OF THE INVENTION

The present invention relates to telephone exchange distributors and more specifically to a protective cable head, the usual function of which is to enable the connection of cables coming from outside onto the members of the telephone exchange while protecting these members against overvoltages by means of fuses, miniature lightning arresters or spark gaps.

In the prior art, protective cable heads include a plurality of modular connection units bearing pairs of connection members at the rear, next to the cable or cables which have to be connected, and at the front, next to the application jumpers. These units are often designed as plates bearing all of the connection members for protection (fuses, lightning arresters), and are clamped together against a rigid support equipped with wireways at the rear and a panel carrying the screws of the spark gaps and the label holder at the front. For each plate the fuses and/or lightning arresters are generally located between springs in cups.

Experience has shown that fuses are not very reliable for the protection of cable heads, and that lightning arresters were not employed to the best of their possibilities because of their mounting with springs and cups, i.e. the medium-quality contact with the tails of the lightning arresters often results in poor current flow capacity. Further, contact components are of complicated design and mounting and the large number of different parts keeps the cost of such cable heads at a relatively high level. Finally, changing a component is often very difficult or, even impossible without dismantling the entire assembly.

SUMMARY OF THE INVENTION

An object of the present invention is to provide a protective cable head which does not display the disadvantages mentioned above and hence is of simple design and easy assembly, while preserving great reliability in the connection and protection.

More particularly, such a cable head for a telephone exchange distributor includes a plurality of modular connection units consisting essentially of a base of insulating material bearing at least one earthing component and pairs of connection members at the rear, next to the cables which have to be connected, and at the front, next to the application jumpers, the units being in addition arranged on a channel for passing through the cables which have to be connected, characterized by including in addition for each connection unit at least one protection module which can be plugged into the base from the front. The module consists essentially of a body of insulating material exhibiting two side-housing intended for receiving each one lightning arrester, and of two pairs of contact components of the wrap-around type arranged on the body and effecting on the one hand the contact between the front and rear connection members arranged face to face and on the other hand the contact with earth, each pair of contact components being associated with a lightning arrester ensuring both the retention of the lightning arrester in its housing and reinforcement of the clamping onto the tails of the lightning arrester upon plugging in the module.

It is also possible to simplify the design and to take still better into account the modern imperatives of tests such as are now usually demanded by the user organizations.

More particularly the improved cable head is noteworthy in that each contact component is in at least two separate portions for the pair as regards the contact between the front and rear connection members, a first portion of the wrap-around type effecting the contact and a second portion ensuring the retention of the tail of the associated lightning arrester, the first portion being in spring contact against the second portion while each contact component of the pair as regards the earthing contact is in one piece and ensures simultaneously the earthing contact and the retention of the tail of the associated lightning arrester.

The cable head may exhibit in addition at least one of the following characteristics:

The front and rear connection members are arranged in the same face of the base while the earthing components are arranged against the opposite face so that each pair of contact components associated with a lightning arrester includes one contact component next to the connection members and another contact component next to the earthing component opposite it; the earthing components of a connection unit consist advantageously of the teeth of a comb arranged against a face of the base inside the latter.

Each contact component consists of a single flat strip the cutting out and bending of which define an end portion of lyre shape between the two arms of which is pinched one tail of the associated lightning arrester, and a main contact portion the camber of which provides a spring effect and enables a slight displacement to be transmitted to the lyre-shaped portion, which reinforces the clamping onto the tail of the lightning arrester at the time of plugging-in the module.

The lyre-shaped end portion is connected to the main contact portion by an intermediate portion which is substantially perpendicular to the latter and transmits the self-tightening displacement upon plugging-in the module. Preferably the end of the arm of the lyre which is farthest from the intermediate portion is formed by an edge bent towards and bearing against the adjacent wall of the housing in the module, which receives the associated lightning arrester, with the other arm of the lyre being likewise formed by an edge bent towards the adjacent wall of the housing so as to ensure the retention of the lyre in the housing even when the lightning arrester has not been put into place.

The main contact portion is arranged against an outer face of the module and has a camber with a central bend which defines a small bearing zone against the face between two arms, the flexibility of which ensures the quality of the contact upon plugging-in the module and the holding of the plugged-in module in place. Advantageously the other end of the main contact portion is bent towards the inside of the side housing for the lightning arrester in order to form a spark gap in air with the lyre-shaped end of the other contact component, and the dimensioning of the main contact portion is such that the module still remains held in place after partial withdrawal which breaks the contact between the associated front and rear connection members.

The side housings in the body of the module are open at their ends with a view to better dissipation of heat.

The first portion of each contact component associated with the front and rear connection members has a front end the bending of which ensures the contact with the second portion of the component and enables a test member to be inserted between the portions. The front end is if necessary rounded off in order to facilitate the insertion of a test member.

The first portion has in its wrap-around portion a longitudinal slit, and in its central zone has a boss like a crenel enabling the fixing of the portion onto the body of the protection module by plugging into an aperture arranged in the body. The wrap-around portion of the first portion has a double convexity on opposite sides of the fixing boss, a convex portion concerning either a front connection member or a rear connection member.

The first portion has a rear end adapted for the reception of an electronic component housed in the rear portion of the body of the protection module.

The second portion of each contact component associated with the front and rear connection members, and the contact component of the pair as regards the earthing contact, are made from the same cut-out blank and differ only in their bending.

The lower portion of the body of the protection module, turned towards the earthing member, has a double slope on opposite sides of a central point forming a fulcrum, the point being associated with the force of reaction taken up by the first portion having double convexity, of each contact component associated with the connection members. Preferably the body of the protection module has essentially only one upper face turned towards the connection members to be widely open in its lower portion.

BRIEF DESCRIPTION OF THE DRAWINGS

Other characteristics and advantages of the invention will become more clearly apparent in the light of the description which is to follow, given by way of illustration but in no way restrictively, by reference to the Figures of the attached drawing in which:

FIG. 3 is a partial cross-section of a module ready to be plugged in;

FIG. 4 is a partial section through a connection unit showing one of its modules plugged in;

FIG. 11 is a cross-section of a complete module of FIG. 10 ready to be plugged in;

DETAILED DESCRIPTION OF THE PREFERRED EMBODIMENTS

Figure 1:
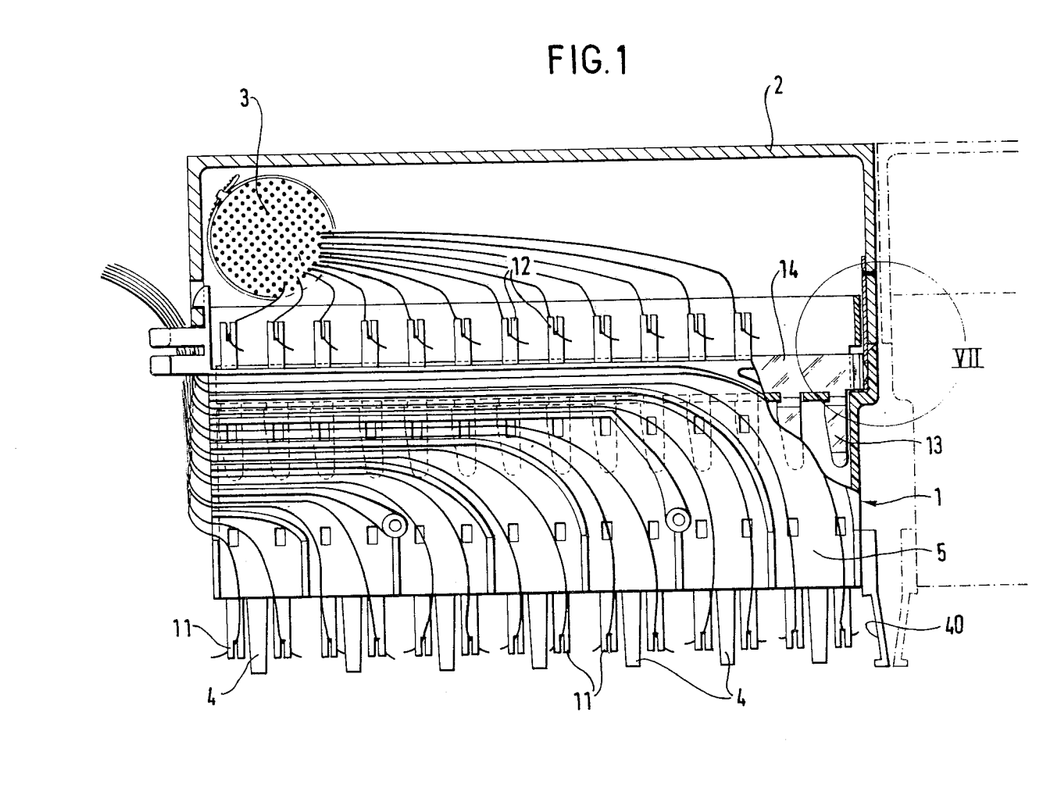
FIG. 1 is an elevation of a modular connection unit the stacking of which defines a cable head in accordance with the invention.

FIG. 1 shows a protective cable head for a telephone exchange distributor including a plurality of modular connection units 1 stacked upon one another and arranged on a channel 2 for passing through the incoming cable 3 to be connected at the rear. The connection units consist in a conventional way essentially of a base of insulating material bearing at least one earthing component and pairs of connection members at the rear, next to the cables which have to be connected, and at the front next to the application jumpers.

Figure 2:
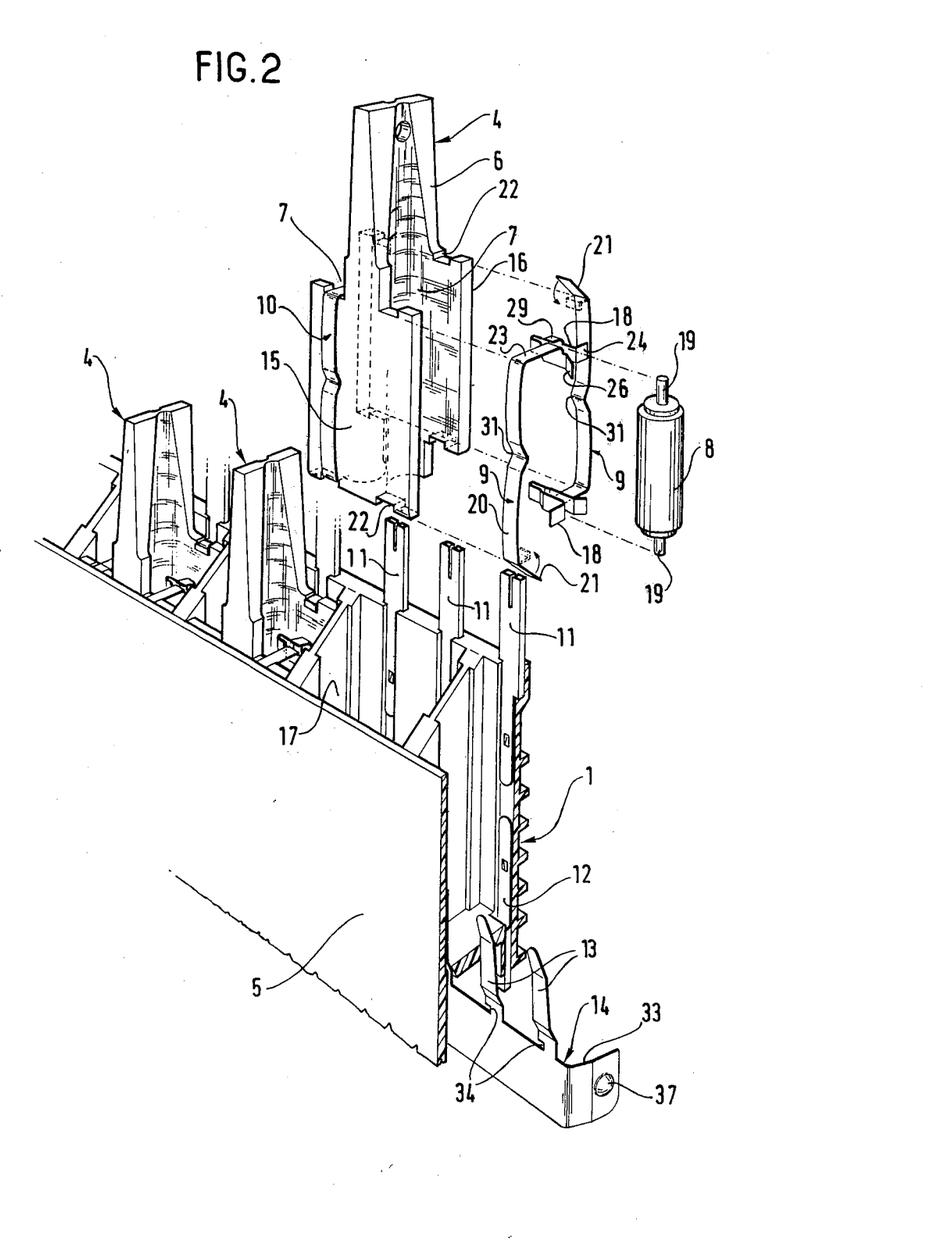
FIG. 2 is an exploded partial perspective detailing the essential components of the cable head as FIG. 1, and especially the plug-in protection modules.

The cable head illustrated in FIGS. 1 and 2 in accordance with the invention, includes in addition for each connection unit at least one protection module 4 which can be plugged from the front into the base 5 of the connection unit, the module consisting essentially of a body 6 of insulating material exhibiting two side-housings 7 arranged for receiving each one lightning arrester 8 or any other equivalent protective member, and of two pairs of contact components 9, 10 of the wrap-around type arranged on the body 6 and effecting on the one hand the contact between the front 11 and rear 12 connection members arranged face to face, and on the other hand the contact with earth (component 13), each pair of contact components associated with a lightning arrester ensuring both the retention of the lightning arrester in its housing and reinforcement of the clamping onto the tails of the lightning arrester upon plugging in the module (this latter effect which is very important will be explained in detail later).

The front 11 and rear 12 connection members are here arranged face to face two by two in the same face of the base 5, while the earthing components are arranged against the opposite face so that each pair of contact components 9 or 10 associated with a lightning arrester includes one contact component next to the connection members and another contact component next to the earthing component opposite to it. As has been illustrated, the earthing components 13 of a connection unit advantageously consist of the teeth of a comb 14 arranged against a face of the base 5 inside the latter.

Before going into greater detail in the description of the protection modules which form a fundamental component of the cable head of the invention, one can already verify the simplification of the design bringing about a reduction in the bulk (with equal dimensioning it is possible to house 112 pairs instead of 28) and in the number of parts, as well as the very favorable alignment of the front and rear connection members face to face, which likewise contributes to simplifying the set of tools for manufacture and the operations of assembly. Thus, once the rear connection of the cable or cables has been terminated the connection on the jumper side is very easily carried out with the wires guided by conventional wireways. The connection members are preferably self-baring connections which bite the core of the wires for a good electrical contact and ensure the retention of the latter by biting into their insulation. The stacking and the fixing of the modular connection units do not pose any particular difficulties and one skilled in the art may employ any means of fixing the units rigidly together (by rods, for example) and fixing them (friction catch, etc.).

As will now be seen, the characteristic and original element in this new cable head lies above all in the plug-in protection modules, the principle and the design of which embody a radical change with respect to former realizations.

The body 6 of the module is in one piece, coming direct from moulding, and exhibits two side housings 7 open at their ends for better dissipation of the heat; it exhibits in addition a plane face 15 turned towards the earthing comb 14 and a plane face 16 parallel with the first, facing the front 11 and rear 12 connection members. Thus, the module can be plugged into the housing 17 in the base 5 which is reserved for it, with a clearance compatible with the thickness of the contact components with a view to an electrical contact of high quality and easy retention of the plugged in module.

The body 6 of the module must bear two pairs of contact components 9 and 10, each pair being associated with a lightning arrester 8. The components of the pair 10 are identical save for a symmetry of camber, with those of the pair 9, so that the description will only deal with a contact component such as 9.

In FIGS. 2 to 5 each contact component 9 consists of a single flat strip cut and bent to define an end portion 18 of lyre shape between the two arms of which is pinched one tail 19 of the associated lightning arrester, and a main contact portion 20 the camber of which provides a spring effect and enables a slight displacement to be transmitted to the lyre-shaped portion, which reinforces the clamping onto the tail of the lightning arrester at the time of plugging-in the module. The other end 21 is bent back (the position in dotted line) in order to cooperate with a corresponding notch 22 in the body of the module. This self-tightening effect will be better understood from the description of FIGS. 6A and 6D a little later.

Figure 5:
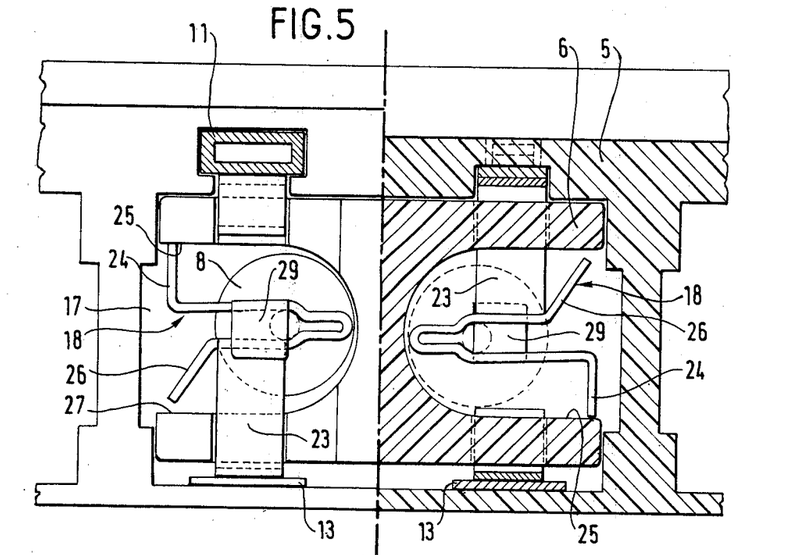
FIG. 5 is a view half in elevation and half in section through a plane perpendicular to the axis of the lightning arresters and passing close to the lyre-shaped end of a contact component, illustrating a plugged-in module.

The lyre-shaped portion 18 is connected to the main portion 20 by an intermediate portion 23 which is substantially perpendicular to the latter and transmits the self-tightening displacement upon plugging-in the module. Thus, the blank for component 9 has substantially the shape of an L. In FIG. 5 the end of that one of the two arms of the lyre which is farther from the intermediate portion 23 is formed by an edge 24 bent towards and bearing against the adjacent wall 25 of the housing 7 in the module. Thus, upon plugging in the module the intermediate portion 23 of each contact component undergoes a slight displacement which, because of the abutment of the end 24 against the adjacent wall 25, reinforces the clamping onto the tail 19 of the lightning arrester. The end of the other arm of the lyre is likewise formed by an edge 26 bent towards the adjacent wall 27 of the housing 7 to ensure the retention of the lyre in the housing even when the lightning arrester has not been put into place.

Figure 6A:
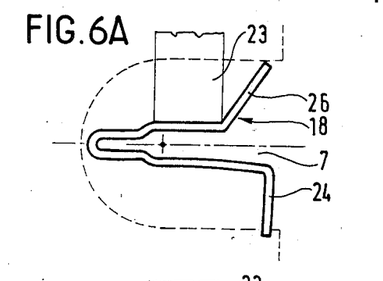
FIGS. 6A to 6D are diagrammatic sections illustrating the design of the lyre-shaped end of a contact component, and its self-clamping effect upon plugging-in modules.

FIGS. 6A to 6D will now be easily understood:

In FIG. 6A the lyre is free, the contact component not yet having been put into place; the contour of the housing 7 is illustrated in dotted line.

Figure 6B:
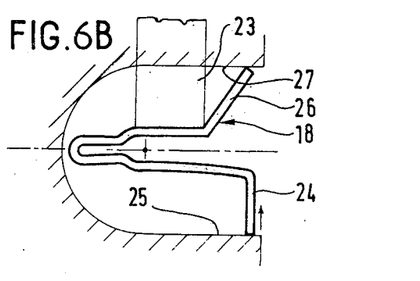

In FIG. 6B the contact component has been put into place in its module and the bent over edges 24, 26 are lightly applied against the adjacent walls respectively 25, 27 by the elasticity of the lyre; hence the contact component is held at this end by these supports, and at the other end by its bent over edge 21 (not visible here).

Figure 6C:
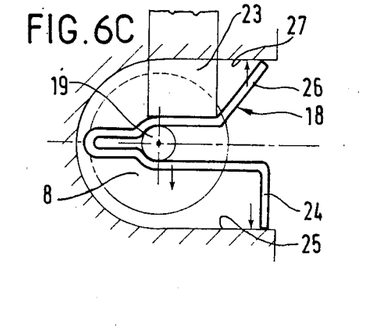

In FIG. 6C the lightning arrester has been put into place, its tails 19 being pinched between the arms of the lyre with a clamping which is already satisfactory; hence the lightning arrester is held in places whereas the module has still not been plugged in.

Figure 6D:
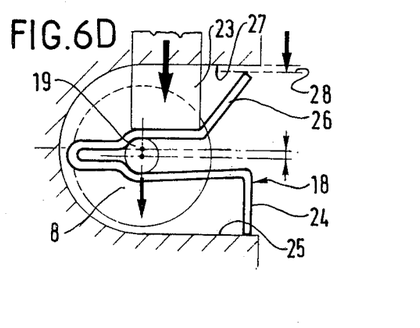

In FIG. 6D the module has then been plugged in; the portion 23 transmits a slight displacement 28 to the arm of the lyre which is the nearer, which deforms the lyre very slightly from the reaction of the edge 24 against the adjacent wall 25 and produces this self-tightening effect.

It must be clearly understood that the edge 24 of the lyre is essential for the self-tightening effect, whereas the participation of the edge 26 is limited to ensuring the retention of the empty contact component, though this retention might equally well be ensured by other means (a cut out tongue, etc.). Furthermore, the higher the force of clamping on the tails of the lightning arrester must be, the nearer the edge 24 must be to perpendicularity to the adjacent wall 25. A positioning tongue 29 is also provided, which forms a spark gap in air with the nearer bent over edge 21.

The main contact portion 20 has a camber with a central bend 31 which defines a small bearing zone against the adjacent face of the module between two arms, the flexibility of which ensures both the quality of the contact upon plugging-in the module and the holding of the plugged-in module in place. Furthermore, the dimensioning of this main contact portion is such that the module still remains held in place after partial withdrawal which breaks the contact between the associated front and rear connection members; it will be sufficient to provide a visible mark on the body of the module or a positive stop in order that the operator is assured that the contact is well broken.

Figures 3, 4:
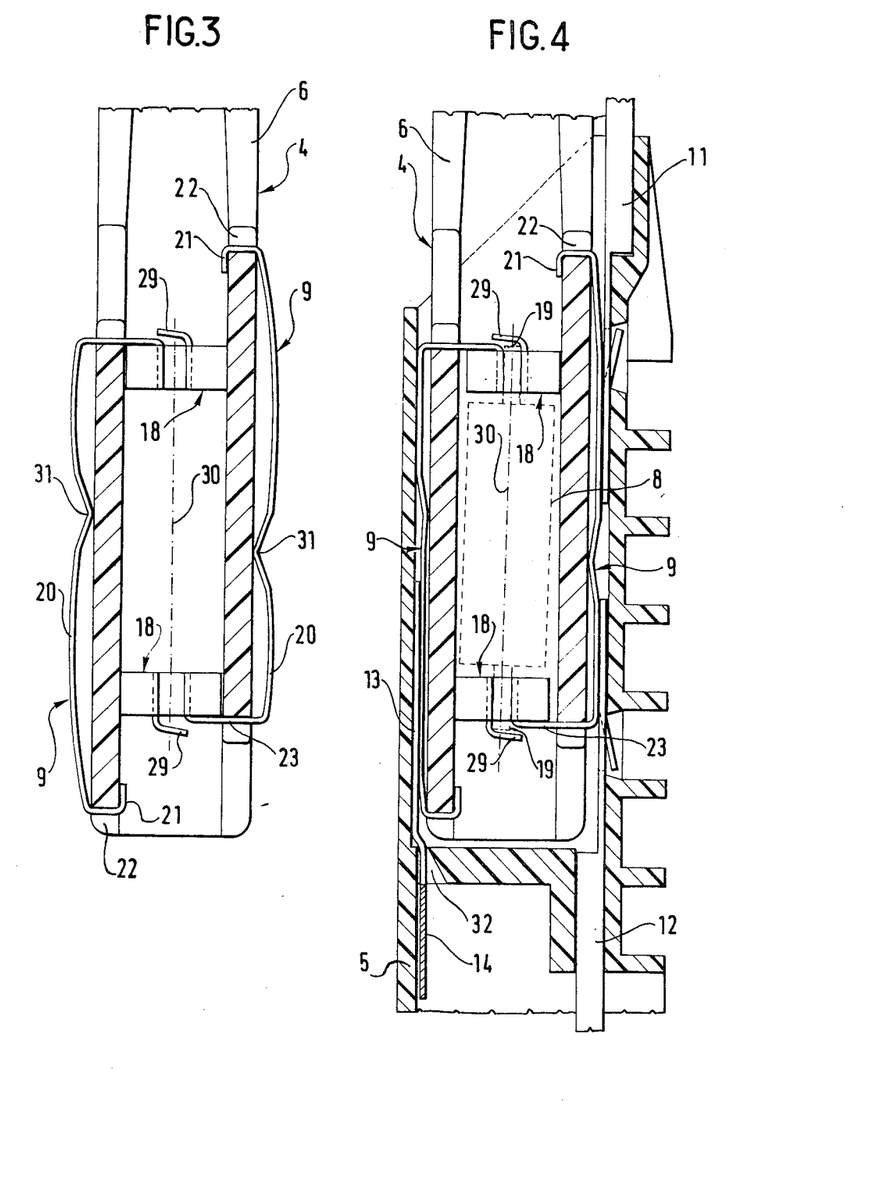

The comb 14 is inserted under the base by passing the teeth 13 into corresponding notches 32 (see FIG. 4). A tongue 33 is also provided at one end of the comb, which has a double function. It fulfills a mechanical function by its spring effect which enables the notches 34 arranged at the bottom of the teeth 13 to hold the comb (see FIGS. 1 and 7 to 9), and also an electrical function for the earthing by contact with a side bar 35 common to all of the modular connection units and fixed to the channel 2.

Figure 7:
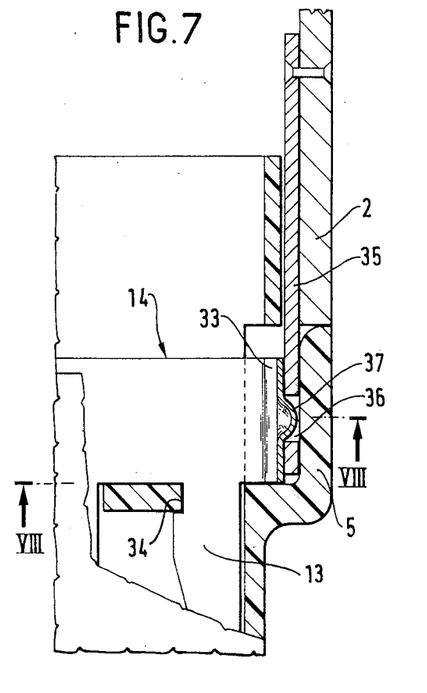
FIG. 7 is a section illustrating the detail VII from FIG. 1, concerning the connection between a connection unit and the channel for passing through the cables, being a connection at the level of which the contact comes into play with the component for earthing.
Figure 8:
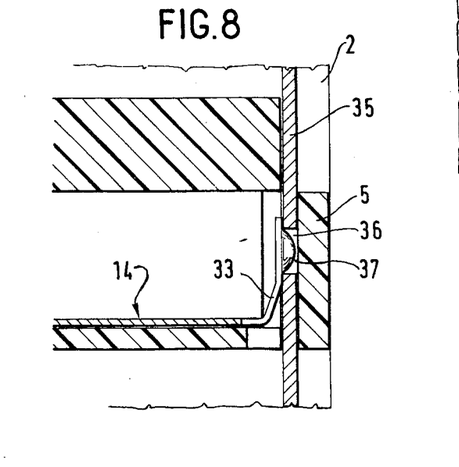
FIG. 8 is a section through line VIII—VIII in FIG. 7.
Figure 9:
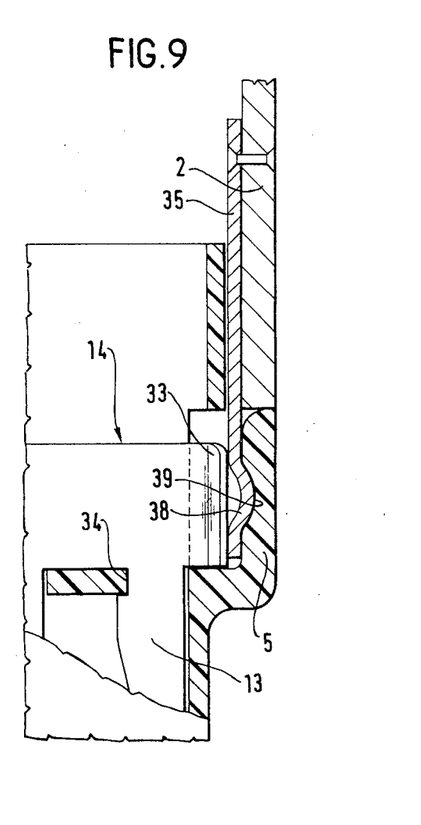
FIG. 9 is a variant of FIG. 7.

FIGS. 7 to 9 show how it is possible to plug the units into the channel 2 while preserving the various functions of the comb 14. In FIGS. 7 and 8 the bar 35 has an aperture 36 which receives a punch mark 37 on the tongue 33 of the comb so that there is a mechanical stop, plugging-in and earthing. As a variant, in FIG. 9 the bar 35 has a corrugation 38 which cooperates with the adjacent contour 39 of the edge of the base 5. Labelholders such as 40 (FIG. 1) may project sideways from the connection units in accordance with usual and convenient practice.

With a cable head in accordance with the invention, the contact at the tails of the lightning arresters proves very good thanks to the high contact pressure and produces a high current flow capacity. Such a design of the cable head also allows numerous manipulations (looping of lines, test connections) due to the possibility of taking out and/or easily adapting a protection module.

Figure 10:
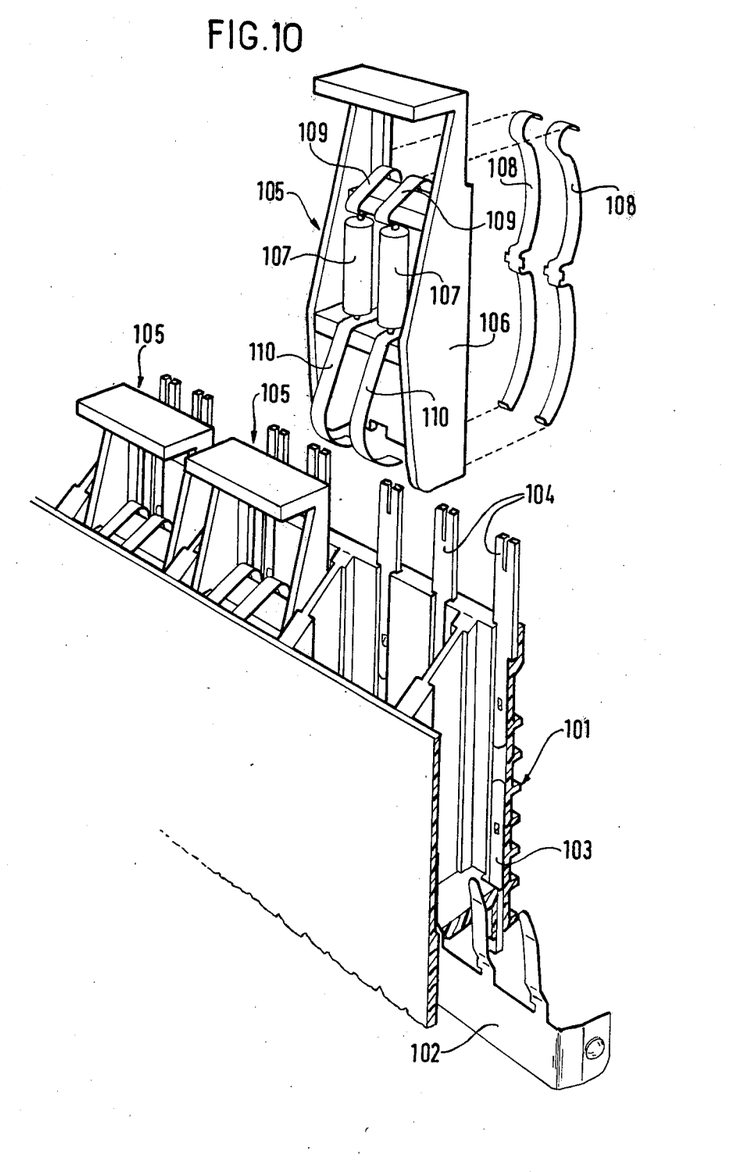
FIG. 10 is an exploded partial perspective detailing the essential components of a cable head in accordance with a further embodiment of the invention and especially the plug-in protection modules.

The embodiment of FIG. 10 includes a plurality of modular connection units 101 consisting essentially of a base of insulating material bearing at least one earthing component 102 and pairs of connection members 103 at the rear, next to the cables which have to be connected, and at the front, 104, next to the application jumpers, the units being in addition stacked and arranged on a channel for passing through the cables which have to be connected (not shown here). The cable head includes in addition for each connection unit 101 at least one protection module 105 which can be plugged into the base from the front, the module consisting essentially of a body 106 of insulating material exhibiting at least one housing for receiving two lightning arresters 107 and of two pairs of contact components of the wrap-around type arranged on the body and effecting the contact between the front 104 and rear 103 connection members arranged face to face, and the contact with earth 102. Each pair of contact components is associated with a lightning arrester ensuring both the retention of the lightning arrester in its housing and reinforcement of the clamping onto the tails of the lightning arrester upon plugging in the module.

Each contact component is in at least two separate portions (here two portions) 108, 109 for the pair as regards the contact between the front 104 and rear 103 connection members, a first portion 108 effecting the contact and a second portion 109 ensuring the retention of the tail of the associated lightning arrester 107. The first portion is in spring contact against the said second portion, while each earth contact component 110 of the pair is one piece and ensures simultaneously the earthing contact and the retention of the tail of the associated lightning arrester.

FIG. 10 does not show all of the details of the contact components and of the portions of the body of the module adjacent to the components, these being details which will be better described by reference to the further Figures, but gives an overall view of the cable head with its plug-in protection modules.

Figure 11:
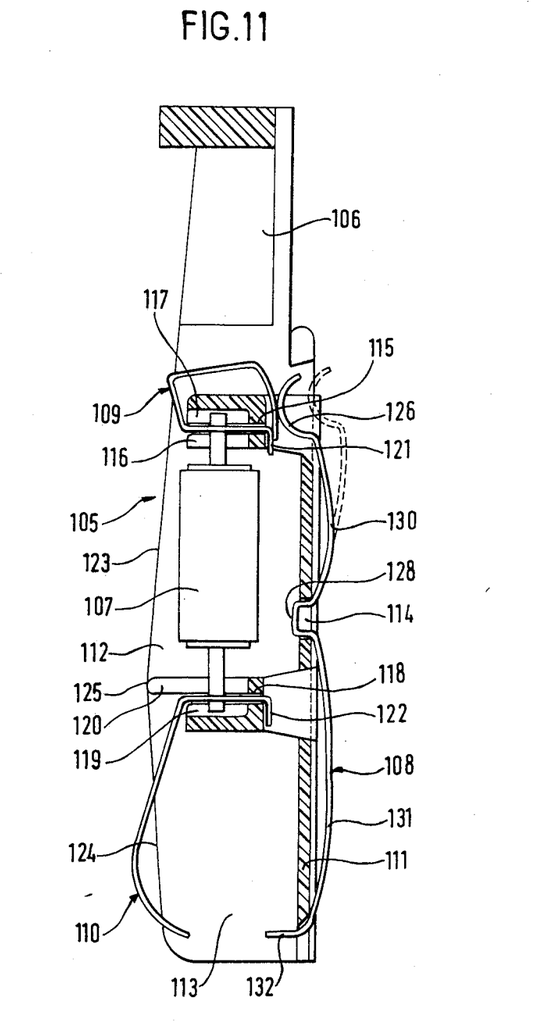

In FIG. 11 the arrangement and the fixing of the contact components appear more clearly as well as the design of the body of the module 105. The one piece moulded body 106 of the module has only one upper face 111 turned towards the connection members so as to be widely open in its lower portion. A central housing portion 112 enables the two lightning arresters 107 to be housed, while a rear portion 113 is provided to receive electronic components such as varistors, diodes, etc. The fixing of each portion 108 of a contact component is effected by plugging into an aperture 114 in the body of the module, while for the other portion 109 of the same component is inserted into a slit 115 edged partially by two lugs 116, 117 which also serve for support upon the insertion of the lightning arrester. For the earthing contact component 110 the same thing is provided as for the portion 109 (the slit 118, and lugs 119, 120). The non-return ensured by the plugging-in for the portion 108, is ensured by the bending of a claw 121, 122 for the portions 109, 110 respectively. The lower portion of the body 106 of the module, turned towards the earthing member, exhibits a double slope 123, 124 on opposite sides of a central sector 125 forming a fulcrum. This produces a better distribution of the forces at the two sides of the module and also enables the taking up of imperfections in the camber of the arms of the contact portion 108.

Figure 12:
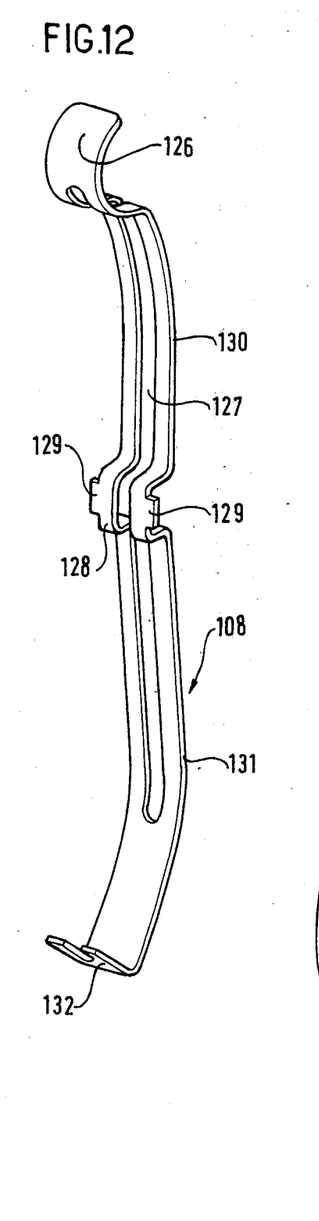
FIGS. 12, 13, 14 are perspectives of contact components which equip the module of FIG. 11.
Figure 13:
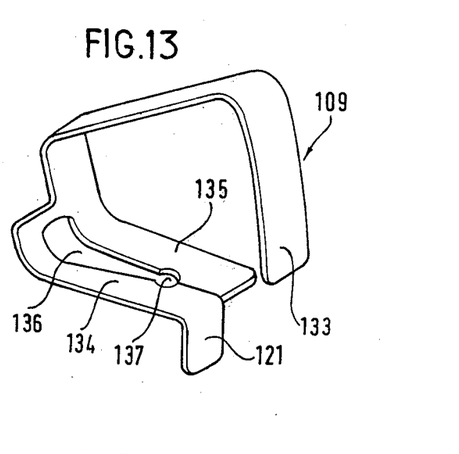
Figure 14:
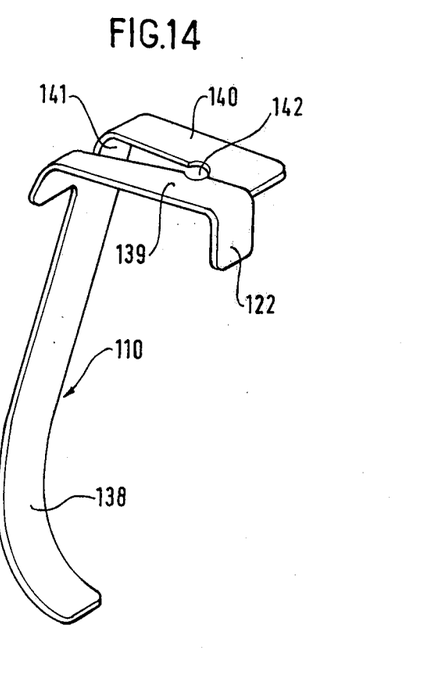

For the description of the contact components which is to follow, reference is made to FIGS. 12, 13, 14 illustrating the components in perspective.

The first portion 108 of each contact component associated with the connection members has a front end 126 the bending of which ensures the contact with the second portion 109 of the component, and enables a test member to be inserted between the portions, this insertion being favored by a rounded-off bending of the front end (the inserted position is illustrated in dotted line in FIG. 11). This portion may exhibit a longitudinal slit 127, which provides a double contact and in its central zone a boss like a crenel 128 enabling the fixing of the portion by plugging into the aperture 114 in the body of the module with two lugs 129. The wrap-around portion has a double convexity on opposite sides of the boss 128, a convex portion 130 concerning the associated front connection member, while the other convex portion 131 concerns the associated rear connection member. If it is desired to house an electronic component in the body of the module, a rear end 132 of the portion 108 will be chosen, which is adapted for the reception of the component in its forked end.

The other portion 109 has an arm, one cambered end 133 of which cooperates with the end 126 of the first portion, and is prolonged by a fork having two arms 134 and 135 between which is defined an aperture 136 which ends in an eyelet 137 for the fixing of the tail of the associated lightning arrester by snapping in so as to be assured of a good electrical contact.

Similarly the contact component 110 associated with the earthing contact exhibits an arm, one cambered end 138 of which ensures the contact and is prolonged by a fork having two arms 139,140 between which is defined an aperture 141 ending in an eyelet 142.

The parts 109 and 110 are made from the same blank and differ only in their bending, which further reduces the cost of the contacts; the representation in perspective in FIGS. 13 and 14 illustrates this feature. Furthermore, the part 108 is equally suited to automatic manufacture in series from pieces of strip.

In FIGS. 15A to 15E various possible modes of use of the module of the invention have been illustrated diagrammatically, these numerous possibilities (tests, looping, isolation) forming important advantages with respect to the devices existing at present.

Figure 15A:
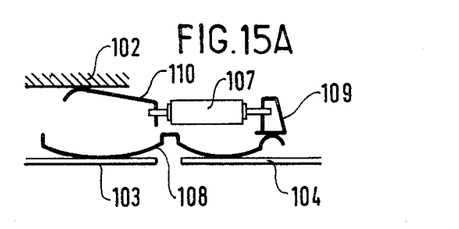
FIGS. 15A to 15E illustrate diagrammatically the various possible modes of use of the module in accordance with the invention as a function of the relative position of the module with respect to the connection members.

In FIG. 15A the normal position is shown where the module is plugged in and fulfills its main role of protection while ensuring electrical contact between the front and rear connection members.

Figure 15B:
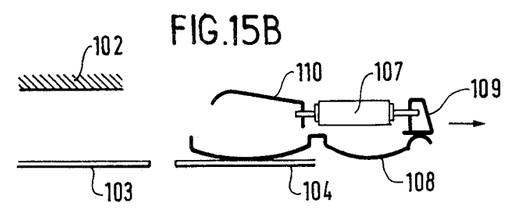

FIG. 15B shows a position of disconnection obtained by simple retreat of the module which is still held in place.

Figure 15C:
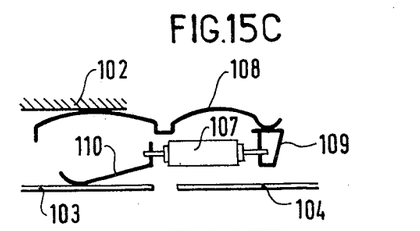

FIG. 15C shows a variant of the previous position, for which the module has been turned round and pushed in, which enables one still to have protection on the line in the position of disconnection.

Figure 15D:
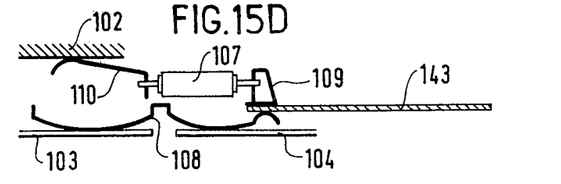

FIG. 15D is the position of FIG. 15A, but a test member 143 has been inserted between the two portions of each contact component associated with the connection members, the portions exhibiting bending favorable to easy insertion of the member.

Figure 15E:
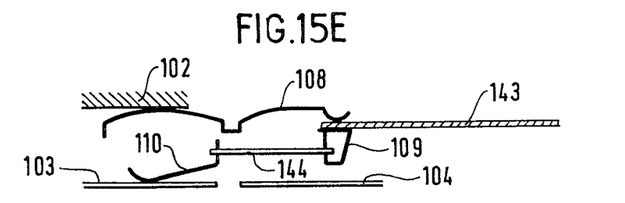

In FIG. 15E a lightning arrester 107 is replaced by a conductor rod 144 which short-circuits the associated contact for the connection to earth and a test member 143 is likewise inserted.

It goes without saying that the invention cannot be restricted to the examples of it which have been given by way of illustration, but comprises any variant which takes up with equivalent means the general definition appearing in the claims.

I claim:

1. A protective cable head for a telephone exchange distributor, including a plurality of modular connection units comprising a base of insulating material carrying at least one earthing component and pairs of connection members disposed both at the rear of the base, next to cables which are to be connected, and at the front of the base, next to application jumpers, said units being arranged on a channel for passing through the cables which are to be connected, characterized by: at least one protection module for each connection unit which can be plugged into the base from the front, said module consisting essentially of a body of insulating material having two side-housings for individually receiving two lightning arresters, and two pairs of wrap-around contact components mounted on the body for establishing electrical contact between the front and rear connection members arranged face to face and for establishing electrical contact with the earthing component, each pair of contact components including means for electrically mounting a lightning arrester and for retaining said lightning arrester in its housing, and means for reinforcing the clamping of tails of the lightning arrester upon the plugging of the module into the base.

2. A cable head as in claim 1, wherein the front and rear connection members are arranged in the same face of the base, and the earthing component is arranged against an opposite face of the base, whereby each pair of contact components associated with a lightning arrester includes one contact component next to the connection members and another contact component next to the earthing component opposite it.

3. A cable head as in claim 2, wherein the earthing component of a connection unit comprises teeth of a comb disposed against an inside face of the base.

4. A cable head as in one of the claims 1 to 3, wherein each contact component comprises a single flat strip cut and bent to define an end portion of lyre shape between two arms of which one tail of an associated lightning arrester is pinched, and a main contact portion having a camber which provides a spring effect and enables a slight displacement to be transmitted to the lyre-shaped portion to reinforce the clamping onto the tail of the lightning arrester at the time of plugging in the module.

5. A cable head as in claim 4, wherein the lyre-shaped end portion is connected to the main contact portion by an intermediate portion which is substantially perpendicular to the latter and transmits the reinforcing displacement upon plugging in the module.

6. A cable head as in claim 5, wherein an end of an arm of the lyre which is farthest from the intermediate portion is formed by an edge bent towards and bearing against an adjacent wall of the housing in the module, which receives the associated lightning arrester.

7. A cable head as in claim 6, wherein the other arm of the lyre is also formed by an edge bent towards an adjacent wall of the housing to ensure the retention of the lyre in the housing even when the lightning arrester has not been put into place.

8. A cable head as in claim 4, wherein the main contact portion has a central bend which defines a small bearing zone between two arms, the flexibility of which ensures a good contact upon plugging in the module and the holding of the plugged in module in place.

9. A cable head as in claim 8, wherein an end of the main contact portion is bent towards the inside of the housing for the lightning arrester to form a spark gap in air with the lyre-shaped end of the other contact component.

10. A cable head as in claim 8, wherein the main contact portion is dimensioned such that the module still remains held in place after partial withdrawal which breaks the contact between the associated front and rear connection members.

11. A cable head as in claim 10, wherein the side housings in the body of the module are open at their ends to better dissipate heat.

12. A cable head as in claim 1, wherein each contact component is in at least two separate portions, a first wrap-around portion effecting contact between the front and rear connection members, and a second portion ensuring the retention of a tail of an associated lightning arrester, said first portion being in spring contact against said second portion, and each earthing contact component of the pair being in one piece and ensuring simultaneously an earthing connection and the retention of the tail of the associated lightning arrester.

13. A cable head as in claim 12, wherein the first portion of each contact component associated with the front and rear connection members has a front end bent to ensure contact with the second portion of the component and to enable a test member to be inserted between the portions.

14. A cable head as in claim 13, wherein the front end is rounded off to facilitate the insertion of a test member.

15. A cable head as in one of the claims 13 or 14, wherein the first portion has a longitudinal slit.

16. A cable head as in claim 15, wherein the first portion has a boss shaped like a crenel in a central zone for enabling the fixing of said portion onto the body of the protection module by plugging into an aperture in said body.

17. A cable head as in claim 16, wherein the first portion has a double convexity on opposite sides of the boss.

18. A cable head as in claim 13, wherein the first portion has a rear end adapted to receive an electronic component housed in the rear portion of the body of the protection module.

19. A cable head as in claim 12, wherein the second portion of each contact component associated with the front and rear connection members, and the earthing contact component of the pair are bent from the same cut-out blank.

20. A cable head as in claim 12, wherein a lower portion of the body of the protection module, facing the earthing member, has a double slope on opposite sides of a central point forming a fulcrum.

21. A cable head as in claim 20, wherein the body of the protection module has only one upper face oriented towards the connection members and is substantially open in its lower portion.

* * * * *